US008769005B2

(12) United States Patent
Madhani et al.

(10) Patent No.: US 8,769,005 B2
(45) Date of Patent: Jul. 1, 2014

(54) METHODS AND DEVICES FOR STANDALONE SOCIAL NETWORKING AND INTERNET PROTOCOL COMMUNICATION SETUP

(75) Inventors: Sunil H. Madhani, Austin, TX (US); Alberto Gutierrez, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 1814 days.

(21) Appl. No.: 11/469,917

(22) Filed: Sep. 5, 2006

(65) Prior Publication Data

US 2008/0056269 A1    Mar. 6, 2008

(51) Int. Cl.
*G06F 15/16* (2006.01)

(52) U.S. Cl.
USPC .......................................... 709/204

(58) Field of Classification Search
USPC .................................. 709/204, 203
See application file for complete search history.

(56) References Cited

U.S. PATENT DOCUMENTS

| 6,175,831 B1 | 1/2001 | Weinreich et al. | |
| 2005/0086211 A1* | 4/2005 | Mayer | 707/3 |
| 2005/0177385 A1 | 8/2005 | Hull et al. | |
| 2007/0030824 A1* | 2/2007 | Ribaudo et al. | 370/328 |
| 2007/0255807 A1* | 11/2007 | Hayashi et al. | 709/219 |

OTHER PUBLICATIONS

Tao Zhang, Eric Van Den Berg, Sunil Madhani, "Peer-to-Peer Network and User Information Discovery and Sharing for Mobile Users and Devices", 0-7803-8887—Sep. 6, 2005 IEEE, 6 pages.

Ogata, Hiroaki, et al. "Computer supported social networking for augmenting cooperation." Computer Supported Cooperative Work (CSCW) 10.2 (2001), 19 pages.

* cited by examiner

*Primary Examiner* — Adnan Mirza

(57) ABSTRACT

Disclosed are methods and devices for a social networking device 102. The methods include calculating a value for a social networking index 460 for contacts in a contact list 103, and prioritizing a subset of contacts 462. IP addresses of contacts retrieved 468 from the Internet according to the social networking index can be preloaded 470 for the initiation of an IP based communication 474. The social networking index is generated from values of predetermined statistics 130 associated with contacts of the contact list. The statistics associated with contacts of a contact list include 464 a number of communications with a contact, a statistical value calculated from lengths of communications with a contact, a time since a last communication with a contact and a statistical value calculated from times between at least two consecutive communications with a contact. Calculating a social networking index 460 can include applying weights 466 with which to combine the values of the predetermined statistics.

38 Claims, 4 Drawing Sheets

TABLE 1. DEFAULT WEIGHTS OF PARAMETERS

| NAME | DEFINITION | DEFAULT VALUE |
|---|---|---|
| Nvs | NUMBER OF TIMES VOICE CALLS MADE TO CONTACT X | 0.25 |
| Nvr | NUMBER OF TIMES VOICE CALLS RECEIVED FROM CONTACT X | 0.25 |
| Mvsl | AVERAGE OF VOICE CALL LENGTH MADE TO CONTACT X | 0.2 |
| Vvsl | VARIANCE FOR Mvsl | 0.1 |
| Mvrl | AVERAGE OF VOICE CALL LENGTH RECEIVED FROM CONTACT X | 0.2 |
| Vvrl | VARIANCE FOR Mvrl | 0.1 |
| Mvsc | AVERAGE TIME BETWEEN TWO CONSECUTIVE VOICE CALLS MADE TO CONTACT X | 0.15 |
| Vvsc | VARIANCE FOR Mvsc | 0.05 |
| Mvrc | AVERAGE TIME BETWEEN TWO CONSECUTIVE VOICE CALLS RECEIVED FROM CONTACT X | 0.15 |
| Vvrc | VARIANCE FOR Mvrc | 0.05 |
| Mvc | AVERAGE TIME BETWEEN TWO CONSECUTIVE VOICE CALL (SENT OR RECEIVED) TO/FROM X | 0.15 |
| Vvc | VARIANCE FOR Vvc | 0.05 |
| Tvsf | TIME SINCE FIRST VOICE CALL MADE TO CONTACT X | 0.05 |
| Tvsl | TIME SINCE LAST VOICE CALL MADE TO CONTACT X | 0.05 |
| Tvrf | TIME SINCE FIRST VOICE CALL RECEIVED FROM CONTACT X | 0.05 |
| Tvrl | TIME SINCE LAST VOICE CALL RECEIVED FROM CONTACT X | 0.05 |
| Nts | NUMBER OF TIMES TEXT CALLS MADE TO CONTACT X | 0.25 |
| Ntr | NUMBER OF TIMES TEXT CALLS RECEIVED FROM CONTACT X | 0.25 |
| Mtsl | AVERAGE OF TEXT CALL LENGTH MADE TO CONTACT X | 0.2 |
| Vtsl | VARIANCE FOR Mtsl | 0.1 |
| Mtrl | AVERAGE OF TEXT CALL LENGTH RECEIVED FROM CONTACT X | 0.2 |
| Vtrl | VARIANCE FOR Mtrl | 0.1 |
| Mtsc | AVERAGE TIME BETWEEN TWO CONSECUTIVE TEXT CALLS MADE TO CONTACT X | 0.15 |
| Vtsc | VARIANCE FOR Mtsc | 0.05 |
| Mtrc | AVERAGE TIME BETWEEN TWO CONSECUTIVE TEXT CALLS RECEIVED FROM CONTACT X | 0.15 |
| Vtrc | VARIANCE FOR Mtrc | 0.05 |
| Mvtc | AVERAGE TIME BETWEEN TWO CONSECUTIVE CALLS (SENT OR RECEIVED, VOICE OR TEXT) TO/FROM X | 0.15 |
| Vvtc | VARIANCE FOR Mvtc | 0.05 |
| Mtc | AVERAGE TIME BETWEEN TWO CONSECUTIVE TEXT CALL (SENT OR RECEIVED) TO/FROM X | 0.15 |
| Vtc | VARIANCE FOR Vtc | 0.05 |
| Ttsf | TIME SINCE FIRST TEXT CALL MADE TO CONTACT X | 0.05 |
| Ttsl | TIME SINCE LAST TEXT CALL MADE TO CONTACT X | 0.05 |
| Ttrf | TIME SINCE FIRST TEXT CALL RECEIVED FROM CONTACT X | 0.05 |
| Ttrl | TIME SINCE LAST TEXT CALL RECEIVED FROM CONTACT X | 0.05 |

*FIG. 3*

METHODS AND DEVICES FOR STANDALONE SOCIAL NETWORKING AND INTERNET PROTOCOL COMMUNICATION SETUP

FIELD

Disclosed are mobile communication devices and methods of a mobile communication device for Internet protocol (IP) communication setup, and more particularly for preloading IP addresses according to a calculated social networking index.

BACKGROUND

Mobile communication devices, such as battery powered mobile telephones, generally operate over cellular networks of service providers utilizing, for example, GSM and CDMA protocols. However, with the advent of Internet-based methods, many mobile communication devices come equipped with multiple transceivers for communication over different types of networks such as wireless fidelity (WiFi) or wireless local area network (WLAN) in addition to GSM and CDMA networks, depending upon preferences and efficiencies. Dual-mode mobile communication devices leverage the ubiquity of wide-area networks (GSM and CDMA) with the high performance and low operational costs of local-area WiFi networks. WiFi "hot spots," are currently limited to offices or homes, coffee shops, airports and neighborhood area networks. It is expected that the hotspots will expand their reach as more systems are installed. A user of a mobile communication device may roam in and out of a plurality of wide-area networks and WiFi networks.

When in range of a WiFi network, a mobile communication device may therefore switch from its cellular network service provider to the WiFi network. The mobile communication device effectively registers with the WiFi network which in turn uses its Internet address as a node, or processing location, for the communication device. Thus, as the user moves to different WiFi hotspots, the mobile communication device can register with different WiFi networks having different IP addresses. The telephone number of the mobile communication device is effectively posted in either a centralized server network or a peer-to-peer network so that the IP address associated with the telephone number may be retrieved.

When initiating contact with a roaming mobile communication device that has an IP address, albeit a temporary IP address, the caller can search the Internet for the roaming device's IP address. Searching the Internet for the IP address of a roaming device can take time and therefore can delay initiating communication. It would be beneficial if the delay of initiating communication with a device, particularly a device with a changing IP address, were reduced.

BRIEF DESCRIPTION OF THE DRAWINGS

FIG. 3 is a table including a list of parameters for the embodiment of FIG. 2;

DETAILED DESCRIPTION

Figure 1:
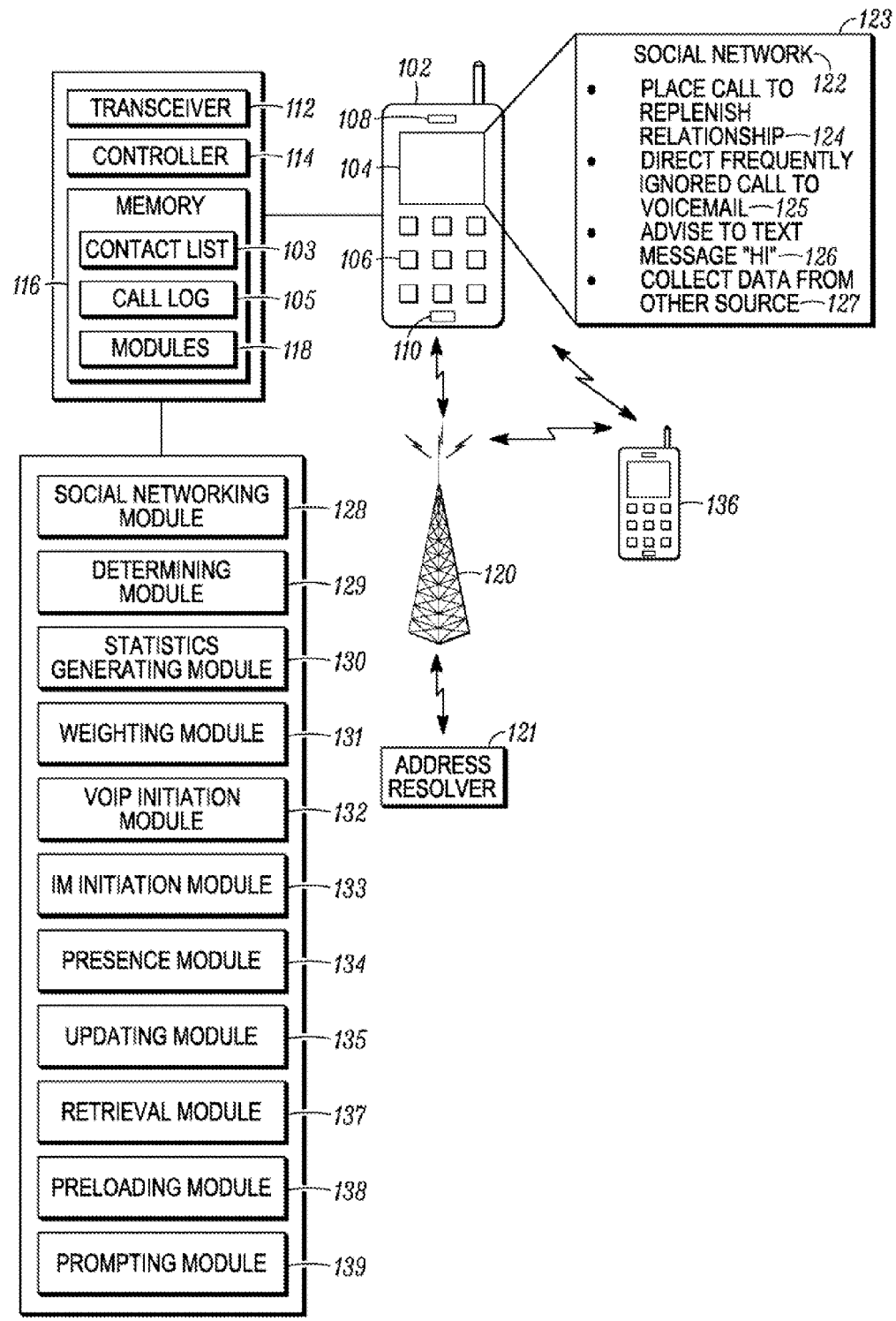
FIG. 1 depicts a standalone social networking electronic device according to an embodiment.

In a peer-to-peer (P2P) network, each participating device can act as both client and server. A social network is a social structure defining or describing the connections between individuals and/or organizations. Social networking applications exploit the concept of a social network to help connect individuals, typically based on user preferences and user identities. A social networking application can be an Internet application that can run on a server or on distributed processing locations, in any case, connecting a plurality of participating devices. Most social networking efforts are geared towards community builder applications.

Disclosed are methods and devices for a standalone or independent social networking device. The methods include calculating a value for a social networking index for contacts in a contact list, and prioritizing a subset of contacts. In this way, the IP addresses of the contacts can be retrieved from the Internet according to the social networking index and then preloaded for the initiation of an IP based communication. Accordingly, when the IP address is preloaded, the delay of initiating communication with a device, and in particular one with a changing IP address, may be reduced.

The described methods and devices also include generating, from a set of call logs, values of a plurality of statistics associated with contacts of a contact list and generating, from the values of the plurality of statistics, a social net index for at least two contacts of the contact list. At least two contacts of the contact list according to social net index are sorted to produce a prioritized list of contacts. Accordingly, one or more IP addresses for the contacts of the prioritized list of contacts can be loaded prior to initiating IP based communication with a device.

The plurality of statistics associated with contacts of a contact list can include a plurality of predetermined statistics. The plurality of predetermined statistics can include a number of communications with a contact, a statistical value calculated from lengths of communications with a contact, a time since a last communication with a contact and a statistical value calculated from times between at least two consecutive communications with a contact. Calculating a social networking index can include applying predetermined weights with which to combine the plurality of predetermined statistics values. Moreover, calculating a social networking index can further include applying self-adjusting weights with which to combine the plurality of predetermined statistics values.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

FIG. 1 depicts a standalone social networking electronic device 102. The electronic device 102 can include a contact list 103 that may be provided to the device in any manner. User input, downloaded information and default listings are some ways in which the contact list can be populated. The contact list can be stored in memory, but may also be accessed in a remote device. It is understood that the configuration and the auxiliary components of the device may take any form.

The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The device 102 can include a display screen 104, a keypad for user input 106, a speaker or transducer 108 and a microphone 110 for user input. One or more transceivers 112 can provide communication between the device 102 and a network of any type, including a remote device such as a personal computer or other electronic device. A controller 114 may execute instructions stored in memory 116, the instructions may be stored as modules 118 including a social networking module 128, a determining module 129, a statistics generating module 130, a weighting module 131, a VoIP initiation module 132, an instant messaging module 133, a presence module 134, an updating module 135, a retrieval module 137, a preloading module 138, and a prompting module 139. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

Further illustrated is a wireless communication network 120. The network 120 of course may be any type of wireless network including an ad hoc or wireless personal area network, a WiFi or wireless local area network, and a cellular or wireless wide area network. Likewise, a server of the network may be of any suitable configuration. The server may be implemented as a single server or as a plurality of servers in communication in any arrangement. The operations of the server may be distributed among different servers or devices that may communicate in any manner. It is understood that the depiction of the device 102 and the network 120 of FIG. 1 is for illustrative purposes.

The memory 116 can be coupled to the controller 114 and configured to store data including a contact list 103 and a log of past communications 105, also referred to herein as a call log. At least two contacts of the contact list as they relate to the log of past communication and according to social net index can be sorted to produce a prioritized list of contacts. A social net index may also be referred to herein as a social networking index. In one embodiment, an IP address of a prioritized contact in a prioritized list of contacts can be retrieved from an address resolver 121 via a network 120.

As will be discussed in more detail below, the social network 122 can result from weights applied to contacts and log data so that statistical processing may provide output as illustrated in the blow-up 123 of the display screen 104. Once a connection has been established between the user of the mobile communication device 102 and another device 136 via, for example, a network as described above, and a log of the connections has been maintained, self-initiating reciprocal connections and enhanced existing relationships may generated. For example, in one embodiment, the social network 122 can prompt 124 the user to place a voice or text messaging call to a party with whom the user has not been in touch with for a predetermined period of time to replenish the relationship. In another embodiment, the social network 122 can direct frequently ignored calls directly to voicemail 125. In another embodiment, the social network 122 can prompt 126 the user with advice to have a voice conversation with a party that the user frequently communicates via text messaging, for example, to say "hello." In still another embodiment, the social network 122 can collect data from another electronic device, such as a spouse's mobile communication device if shared and make suggestions on common names 127. In these embodiments, and in others, log information and statistical processing in a standalone electronic device 102 as discussed in detail below utilizes the user's unstructured social network to form a social connector to relate the otherwise unrelated without requiring user preferences and user identities.

A social networking module 128 that is configured to calculate a social networking index for a contact of the contact list and a determining or sorting module 129 that is configured to sort contacts of the contact list according to social networking index to produce a prioritized list of contact can provide output as illustrated in the previously described blow-up 123 of the display screen 104. In those embodiments described above, and in other embodiments, parameters can include, for example, a number of communications with a contact, a statistical value calculated from lengths of communications with a contact, a time since a last communication with a contact, and a statistical value calculated from times between at least two consecutive communications with a contact. Accordingly, the device or a remote device such as a desktop communication device may keep a log that can be characterized in different manners such as the number of voice/text calls made, voice/text call length or duration as stored in the device 102, the voice/text call sender identity, the voice/text call receiver identity as stored in the device 102, missed voice/text calls, ignored voice/text calls, and if desired, owners social network preferences for his/her contact. It is understood that parameters and log entries such as those above-described can be of any type and are within the scope of this discussion.

Synchronizing logs from desktop email/SMS messages and/or from telephone/voice communication of any type of communication device can provide information to develop applications such as gaming applications for relationship building where digital profiling tracks the percentage of time a user spends on desktop keyboard/cellular telephone keypad of the communication device. It is understood that a log can include any type of information, including but not limited to voice calls/messaging, and more particularly any digital form of communication. For example, the described standalone social networking can provide application profiles to predict that a user will go to a website after visiting another website with a particular probability.

As mentioned, at least two contacts of the contact list as they relate to the log of past communication and according to social net index can be sorted to produce a prioritized list of contacts. In one embodiment, an IP address of a prioritized contact in a prioritized list of contacts can be retrieved from an address resolver 121 via a network 120. Accordingly, when a caller to, for example, a roaming mobile communication device 136 initiates contact with the roaming mobile communication device that has an IP address, albeit a temporary IP address, the caller effectively can search the Internet for the roaming device's IP address. The described devices and methods include calculating a value for a social networking index for contacts in a contact list, and prioritizing a subset of contacts. In this way, the IP addresses of the contacts can be retrieved from the Internet according to the social networking index and then preloaded for the initiation of an IP based communication. Accordingly, when the IP address is preloaded, the delay of initiating communication with a device, and in particular one with a changing IP address, may be reduced.

Figure 2:
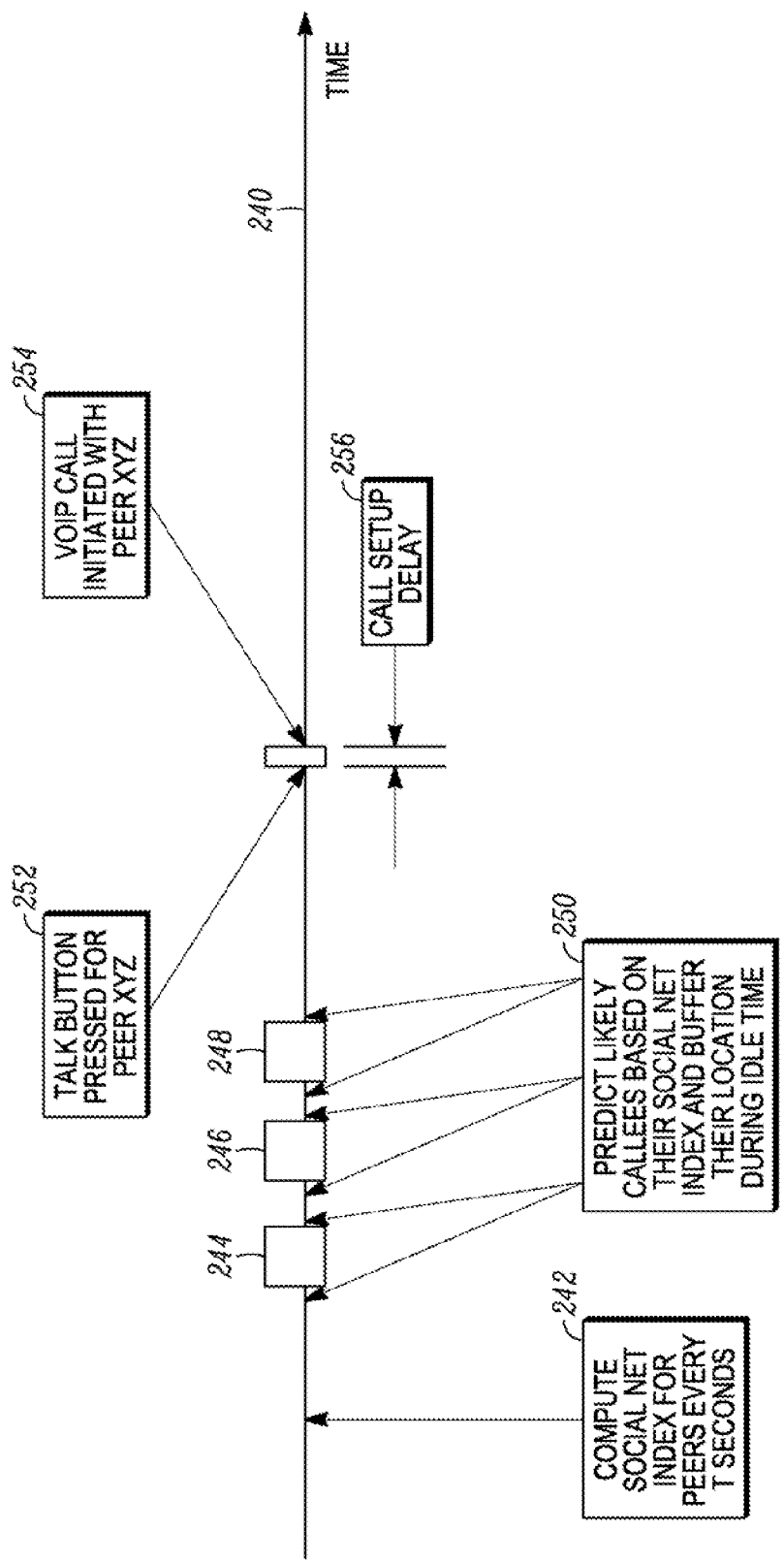
FIG. 2 shows a social net index method according to an embodiment.

Turning to FIG. 2, a social net index method is illustrated. The line 240 is a time line where during an idle time period there can be a computation of the social net index for peer periodically, or randomly 242. The peers for which a high social index has been determined 244, 246 and 248 provide a prediction that they will be likely callees based on their social net index. Their locations or IP addresses can be buffered or cached during idle time 250. The standalone mobile device 102 (see FIG. 1) can utilize a peer discovery algorithm to locate and find out the IP address of the peer. Depending on the peer-model used, the discovery algorithm can differ. In some P2P implementations, IP addresses of peers are stored in a so-called distributed hash table (DHT) distributed among peers of the P2P network. A DHT based algorithm is used to locate the IP address among the peers. In a non-P2P model, usually IP address is available from a domain name server (DNS), and the query is accordingly sent to a DNS. By way of example, the device 102 can initiate communication 252 with a peer "XYZ" when the user presses a talk button for peer XYZ so that, for example, a Voice over Internet Protocol (VoIP) call 254 is initiated. The call set up time 256 is illustrated along the time line 240.

FIG. 3 is a table including a list of parameters. It is understood that more or fewer parameters may be used to arrive at the social index value. The list of parameters further includes examples of weights associated with the parameters. The categories of parameters can include, for example, communication duration or length, communication timing and communication records.

It is understood that the listed parameters are examples of parameters. Different communication scenarios may suggest different parameters or variables. For example where a manager calls up or telephones to check on certain status and then employee replies via email/text messaging, the following parameters may apply: Mvtc=Average time between two consecutive call (sent or received, voice or text) to/from X; and Vvtc=Variance for Vvc.

Calculating the social net index can include using a plurality of predetermined weights including a weighted combination of values of the plurality of statistics. Calculating the social net index may also include using a plurality of self-adjusting weights for a weighted combination of values of the plurality of statistics. Self-adjusting weights can be provided by a variety of factors. For example, if there is a prediction that a particular contact is a likely callee and that callee is not dialed or a call is not received, then the standalone social network can adjust the weights accordingly. Also, when that particular callee is called or a caller calls, then the weights can be updated accordingly. A self-correcting property provides adjustment in real-time and dynamic updates for any untoward changes in calling pattern.

For a self-correction property, rules based engine framework, for example, can be applied. It may be understood that rules of a rules based engine are basic components of Artificial Intelligence where rules can be changed in accordance with the change in environment to provide output.

As mentioned above, different communication scenarios may apply. For example, in one embodiment, a call or other communication is expected from "X" and "X" does not call. In this embodiment it may be supposed that "X" does not call so then the weight associated with the following parameter for "X" (see FIG. 3) may be changed accordingly. Various considerations can be made. For example, when making a wrong prediction the first time, a 25% change (decreasing the magnitude impact of default value) in an associated weight can be made. For making a wrong prediction for the second time, 66% change (decreasing the magnitude impact of default value) in an associated weight can be made. For making a wrong prediction for the third time, default values can be set to 0. Accordingly, in this scenario, the weights that can be associated with "X"'s parameters can be changed can be as follows: Nvr, Mvrl, Vvrl, Mvrc, Mvc, Tvrf, and Tvrl.

In another embodiment, once X calls, the parameter weights can be changed in positive direction. For example, when X calls for the first time after a wrong prediction was made, a 25% change (increasing the magnitude impact of default value) in associated weight can be made. When X calls for the second time after a wrong prediction was made, 66% change (increasing the magnitude impact of default value) in the associated weight can be made. When making a wrong prediction for the third time, values can be set to a default value.

Again, different communication scenarios may apply. For example, in one embodiment, a call or communication is expected to be made to "X" and "X" is called. In this embodiment, "X" was further supposed to be called however, the call is not made. Then the weight that can be associated with the parameters for "X" can be changed accordingly, for example, by 25%/66%/100% increasing and decreasing magnitude. In this example, the weights associated with "X's" parameters that can be changed follow: Nvs, Mvsl, Vvsl, Mvsc, Mvc, Tvsf and Tvsl. It is understood that different weights can follow different changes that are not necessarily 25%/66%/100% as described above. For example, different weights may be 33%/66%/100% or any other combination of variations.

A calculation for a social net index value can be described in the following manner. Let the 34 parameters listed in FIG. 3 be termed as P1, P2, P3, P4, . . . , P33, and P34 where P1 corresponds to Nvs, P2 corresponds to Nvr, . . . , and P34 corresponds to Ttrl. Let W(i) be the weight associated with the above mentioned parameter where i=1, 2, 3, 4, . . . , 34, i.e. W(1) is the weight associated with parameter P1 which corresponds to Nvs and W(34) is the weight associated with parameter P34 which corresponds to Ttrl.

There may be thirty-four parameters (P1, P2, . . . , P34) and there may be weights associated with the thirty-four parameters (W1, W2, . . . , W34). For the contacts in the contact list, there may be thirty-four parameters and the respective weights. Accordingly, a Social Net Index of Contact #1=Sn1=W1*P1+W2*P2+ . . . +W33*P33+W34*P34. Therefore, a mathematical representation may be:

$$Sn(k) = \sum_{i=1}^{N} P(i) \cdot W(i)$$

where N=34 in this case and k is an index for enumerating the contacts of the contact list, that is, k is the contact number. Of course, the number of parameters and/or any variables can depend upon the communication scenario or other factors.

Figure 4:
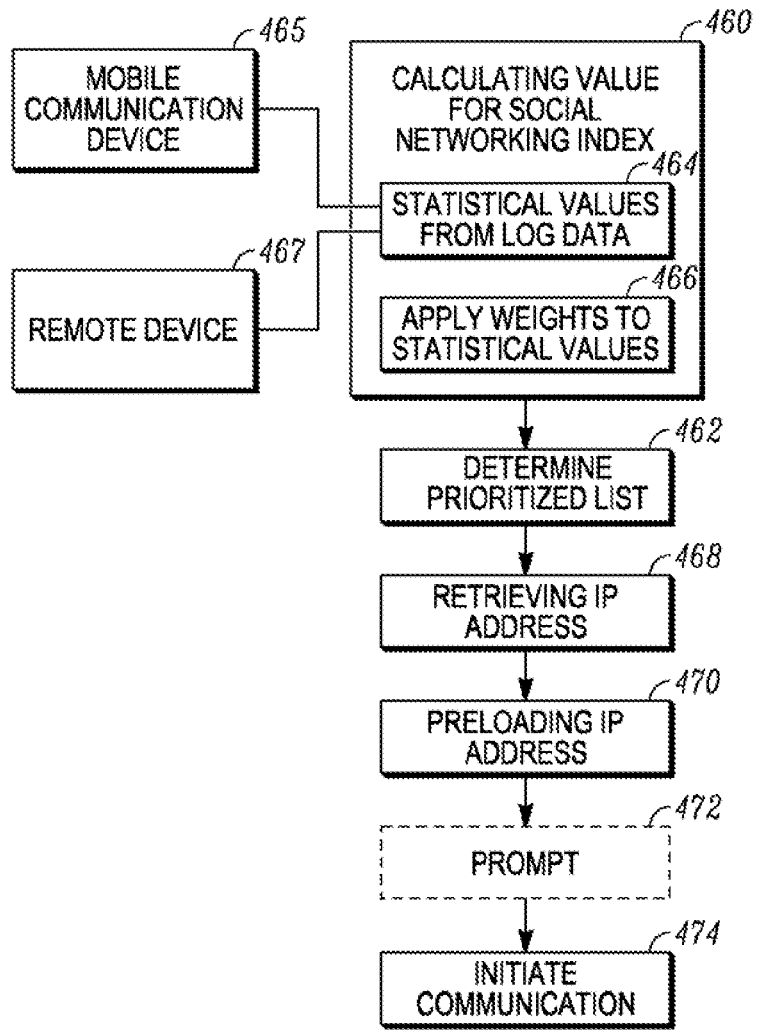
FIG. 4 is a flow diagram illustrating an embodiment of a method.

FIG. 4 is a flow diagram illustrating an embodiment of a method in accordance with this discussion. The embodiment is a method in a mobile communication device having a contact list including a plurality of contacts, the method including calculating a value for a social networking index for at least two contacts of the plurality of contacts to generate calculated social net index values 460 and determining a prioritized subset of the at least two contacts of the plurality of contacts according to the calculated values 462. Sorting at least two contacts of the contact list according to the social net index can produce a prioritized list of contacts.

Calculating a social networking index can include calculating a plurality of predetermined statistics values by a statistic generating module 130 (see FIG. 1), the values calculated from data in a log of past communications 464 from a mobile communication device 465 or a remote device 467 and further applying predetermined weights by a weighting module 131 with which to combine the plurality of predetermined statistics values 466. The weighting module may further apply self-adjusting weights to statistics. The method can further include retrieving by a retrieving module 137 from an address resolver 121 associated IP addresses for the contacts of the prioritized subset 468 and preloading the associated IP addresses of the contacts in the prioritized subset 470. A preloading module 138 can be configured to preload the associated IP addresses for the contacts of the prioritized subset 468. The user may be prompted 472 by prompting module 139 as to whether to initiate communication. The method can include initiation of communication 474 based upon the preloaded address or location.

The initiated communication may be of any type. A VoIP initiation module 132 can be configured to initiate a VoIP communication. An instant messaging communication module 133 can be configured to initiate an instant messaging communication. An IP presence state communication module 134 can be configured to initiate an IP presence state communication. Moreover, the electronic device 102 can be configured to access a circuit based communication network. It is understood that any type of communication can be initiated and is within the scope of this discussion.

Figure 5:
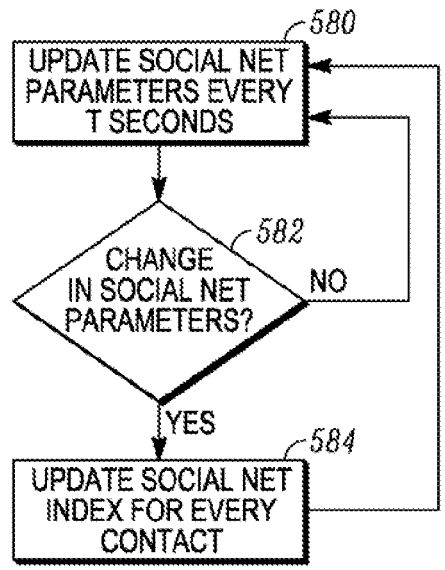
FIG. 5 is a flowchart illustrating an embodiment of a method for updating the social net values.

FIG. 5 is a flowchart illustrating an embodiment of a method for updating the social net values. As the activity of the standalone social networking device continues, updating the social index values for the contacts, including new contacts, revised contacts and removed contacts can also include any corresponding weights and any associated parameters. An updating module 135 can be configured to update the social networking index for each contact of the contact list, and configured to correspondingly update the prioritized list of contacts. The method includes updating the value of the social networking index for the at least two contacts of the plurality of contacts at predetermined time intervals or randomly 580. If there is a change in the social net index values 582, then the method can include updating correspondingly the prioritized subset 584.

The above-described methods and devices therefore can include generating, from a set of call logs, values of a plurality of statistics associated with contacts of a contact list and generating, from the values of the plurality of statistics, a social net index for at least two contacts of the contact list. At least two contacts of the contact list according to social net index are sorted to produce a prioritized list of contacts. Accordingly, one or more IP addresses for the contacts of the prioritized list of contacts can be loaded prior to initiating IP based communication with a device. When a caller to a roaming mobile communication device initiates contact with the roaming mobile communication device that has an IP address, albeit a temporary IP address, the caller can search the Internet for the roaming device's IP address. It may be beneficial if the delay of initiating communication with a device having an address or location, particularly with a changing IP address is reduced.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. A method in a mobile communication device having a contact list including a plurality of contacts, the method comprising:
    calculating a value for a social networking index for at least two contacts of the plurality of contacts based on a number of communications with a contact to generate calculated values;
    determining a prioritized subset of the at least two contacts of the plurality of contacts according to the calculated values;
    retrieving from an address resolver associated IP addresses for the contacts of the prioritized subset; and
    preloading the associated IP addresses of the contacts in the prioritized subset.

2. The method of claim 1, further comprising:
    processing instructions to initiate an IP based communication over a communication network to a contact in the prioritized subset using the preloaded associated IP address of the contact.

3. The method of claim 2, wherein processing instructions to initiate an IP based communication comprises:
    processing instructions to initiate a VoIP communication over the communication network.

4. The method of claim 2, wherein processing instructions to initiate an IP based communication comprises:
    processing instructions to initiate an instant messaging communication over the communication network.

5. The method of claim 2, wherein processing instructions to initiate an IP based communication comprises:

processing instructions to initiate an IP presence state communication over the communication network.

6. The method of claim 1 wherein the mobile communication device is configured to access a circuit based communication network.

7. The method of claim 1 wherein:
the mobile communication device is synchronized with a desktop based communication device; and
the social networking index combines predetermined statistical values based on at least one of voice calls, email messages and text messages.

8. The method of claim 1, further comprising:
updating the value of the social networking index for the at least two contacts of the plurality of contacts; and
updating correspondingly the prioritized subset.

9. The method of claim 1, further comprising:
generating a prompt to initiate a communication to a contact of the contact list based on a value for a social networking index for the contact.

10. The method of claim 1, wherein calculating a social networking index comprises:
calculating a plurality of predetermined statistics values, the values calculated from data in a log of past communications.

11. The method of claim 10, wherein calculating a social networking index further comprises applying predetermined weights associated with parameters with which to combine the plurality of predetermined statistics values.

12. The method of claim 10 wherein calculating a social networking index further comprises applying self adjusting weights associated with parameters with which to combine the plurality of predetermined statistics values.

13. The method of claim 10, wherein the predetermined statistics values comprise:
the number of communications with the contact.

14. The method of claim 10, wherein the predetermined statistics values comprise:
a statistical value calculated from lengths of communications with a contact.

15. The method of claim 10, wherein the predetermined statistics values comprise:
a time since a last communication with a contact.

16. The method of claim 10, wherein the predetermined statistics values comprise:
a statistical value calculated from times between at least two consecutive communications with a contact.

17. A method in a mobile communication device, the method comprising:
generating, from a set of call logs, values of a plurality of statistics associated with contacts of a contact list of the mobile communication device, wherein the values of the plurality of statistics comprise a number of communications with a contact;
generating, from the values of the plurality of statistics, a social net index for at least two contacts of the contact list;
sorting the at least two contacts of the contact list according to social net index, to produce a prioritized list of contacts; and
preloading an IP address for the contacts of the prioritized list of contacts.

18. The method of claim 17, further comprising:
processing instructions to initiate a VoIP communication over a communication network to a contact of the prioritized list of contacts using the preloaded IP address of the contact.

19. The method of claim 17, further comprising:
processing instructions to initiate an instant messaging communication over a communication network to a contact of the prioritized list of contacts using the preloaded IP address of the contact.

20. The method of claim 17, further comprising:
processing instructions to initiate an IP presence state communication over a communication network to a contact of the prioritized list of contacts using the preloaded IP address of the contact.

21. The method of claim 17 wherein the mobile communication device is configured to access a circuit based communication network.

22. The method of claim 17 wherein:
the mobile communication device is synchronized with a desktop based communication device; and
the social net index combines predetermined statistical values based on at least one of voice calls, email messages and text messages.

23. The method of claim 17, further comprising:
generating a prompt as to whether to initiate a communication to a contact of the contact list based on the social net index; and
processing instructions to initiate a VoIP communication to the contact when a positive response to the prompt is received.

24. The method of claim 17, wherein generating a social net index comprises:
calculating, using a plurality of predetermined weights associated with parameters, a weighted combination of values of the plurality of statistics to generate the social net index.

25. The method of claim 17, wherein generating a social net index comprises:
calculating, using a plurality of self-adjusting weights associated with parameters, a weighted combination of values of the plurality of statistics to generate the social net index.

26. The method of claim 25, wherein calculating a weighted combination of values of the plurality of statistics comprises calculating a weighted combination of at least two of:
the number of communications with the contact;
a statistical value calculated from lengths of communications with a contact;
a time since a last communication with a contact; and
a statistical value calculated from times between at least two consecutive communications with a contact.

27. The method of claim 17, further comprising:
updating the social net index for each contact of the contact list.

28. An electronic device, comprising:
a controller configured to process instructions of instruction modules;
memory coupled to the controller and configured to store data including a contact list and a log of past communications, and configured to store instructions of instruction modules;
a social networking module configured to calculate a social networking index for a contact of the contact list based on a number of communications with a contact;
a determining module configured to sort contacts of the contact list according to social networking index to produce a prioritized list of contacts; and
an IP address retrieval module configured to retrieve an IP address of a contact in the prioritized list of contacts from an address resolver.

29. The device of claim 28, further comprising:
a VoIP initiation module configured to initiate a VoIP communication.

30. The device of claim 28, further comprising:
an instant messaging communication module configured to initiate an instant messaging communication.

31. The device of claim 28, further comprising:
an IP presence state communication module configured to initiate an IP presence state communication.

32. The device of claim 28 wherein the electronic device is configured to access a circuit based communication network.

33. The device of claim 28, further comprising:
a statistics generating module configured to generate statistics from data in the log of past communications.

34. The device of claim 33, further comprising:
a weighting module configured to apply predetermined weights associated with parameters to statistics generated by the statistics generating module.

35. The device of claim 33, further comprising:
a weighting module configured to apply self-adjusting weights associated with parameters to statistics generated by the statistics generating module.

36. The device of claim 33, wherein statistics generated by the statistics generating module comprise at least two of:
the number of communications with the contact;
a statistical value calculated from lengths of communications with a contact;
a time since a last communication with a contact; and
a statistical value calculated from times between at least two consecutive communications with a contact.

37. The device of claim 28, further comprising:
an updating module configured to update the social networking index for each contact of the contact list, and configured to correspondingly update the prioritized list of contacts.

38. The device of claim 28, further comprising:
a prompting module configured to generate a prompt as to whether to initiate a communication to a contact of the contact list, and configured to initiate a VoIP communication to the contact upon receipt of a positive response to the prompt.

* * * * *